United States Patent
Kaul

(10) Patent No.: US 9,971,616 B2
(45) Date of Patent: May 15, 2018

(54) VIRTUAL MACHINE SUSPENSION

(71) Applicant: Red Hat Israel, Ltd., Raanana (IL)

(72) Inventor: Yaniv Kaul, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 148 days.

(21) Appl. No.: 13/777,201

(22) Filed: Feb. 26, 2013

(65) Prior Publication Data
US 2014/0245294 A1  Aug. 28, 2014

(51) Int. Cl.
*G06F 9/455* (2018.01)

(52) U.S. Cl.
CPC ............ *G06F 9/45558* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 5,680,540 A | * | 10/1997 | Pearce | G06F 9/4418 710/59 |
| 6,131,166 A | * | 10/2000 | Wong-Insley | G06F 9/542 713/300 |
| 2007/0260702 A1 | * | 11/2007 | Richardson et al. | 709/217 |
| 2009/0172439 A1 | * | 7/2009 | Cooper et al. | 713/323 |
| 2009/0198809 A1 | * | 8/2009 | Goto | G06F 9/45558 709/223 |
| 2010/0162238 A1 | * | 6/2010 | Warfield | G06F 9/45533 718/1 |
| 2010/0235835 A1 | * | 9/2010 | Nishiguchi et al. | 718/1 |
| 2013/0174151 A1 | * | 7/2013 | Nakajima | G06F 9/461 718/1 |
| 2014/0130040 A1 | * | 5/2014 | Lemanski | 718/1 |

\* cited by examiner

*Primary Examiner* — Sisley Kim
(74) *Attorney, Agent, or Firm* — Lowenstein Sandler LLP

(57) ABSTRACT

A method and system for suspending and resuming a virtual machine. The method and system include a hypervisor to provide a guest operating system of a virtual machine with an instruction for the virtual machine to enter a sleep mode. The hypervisor receives, from the guest operating system, a confirmation that the virtual machine is in the sleep mode. Following receipt of confirmation that the virtual machine is in sleep mode, the hypervisor suspends the virtual machine.

14 Claims, 3 Drawing Sheets

VIRTUAL MACHINE SUSPENSION

TECHNICAL FIELD

Embodiments of the present disclosure relate to a virtual computing system, and more specifically, to suspending and resuming a virtual machine.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

DETAILED DESCRIPTION

Figure 1:
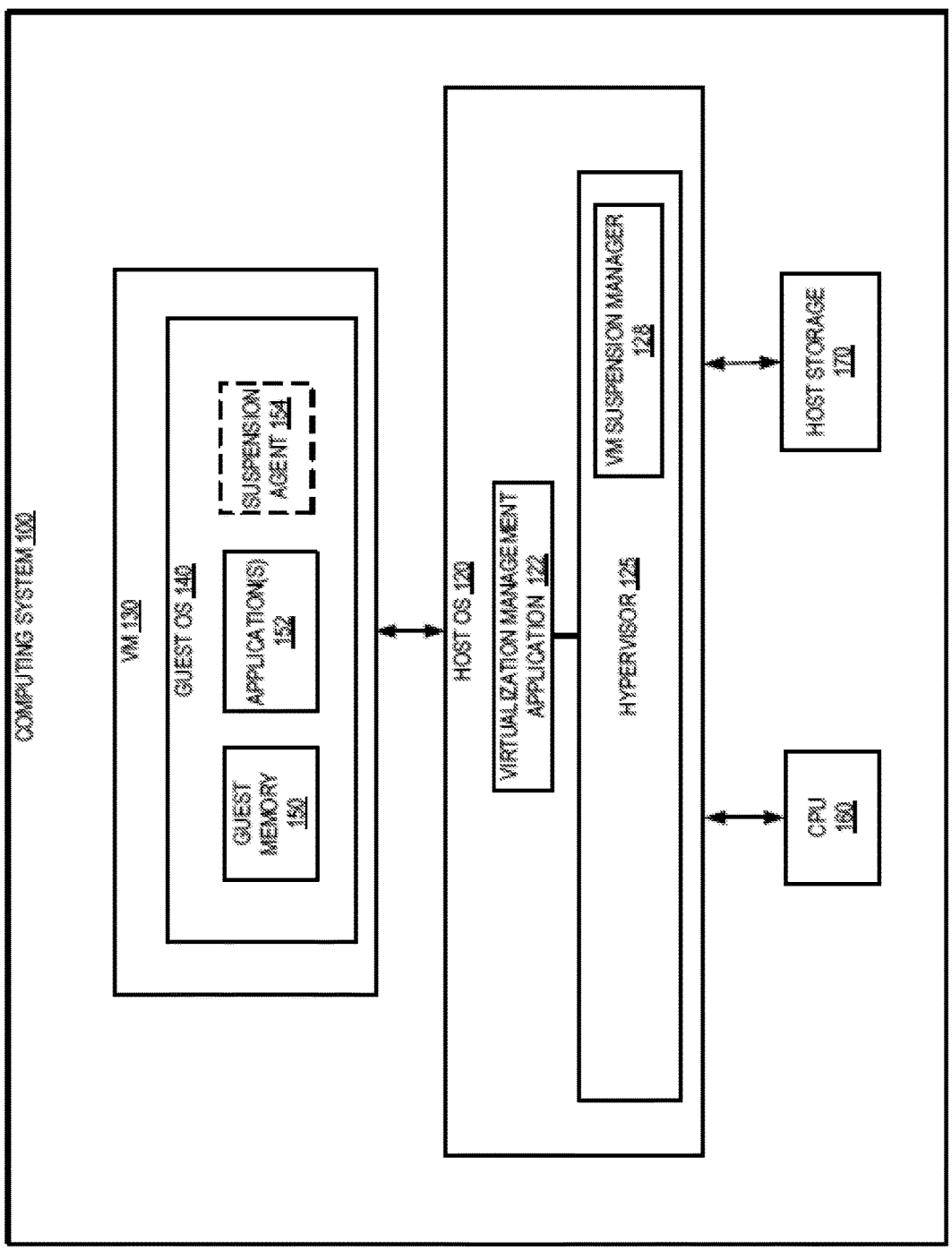
FIG. 1 is a block diagram of an example computing system including a virtual machine suspension manager for suspending and resuming a virtual machine, according to an embodiment of the present disclosure.

In a virtual computing system, it may be desired to suspend the operation of a guest operating system (OS) executing on a virtual machine, for example, for power management purposes. In a conventional virtual computing system, suspension of a virtual machine running under the management of a hypervisor is typically performed according to two approaches. In the first, the guest OS uses S4 ACPI capabilities to suspend the virtual machine to a disk such that the virtual machine memory and state information are saved (e.g., "hibernated") to a file within the guest OS. Although this approach provides for an accurate suspension of the virtual machine wherein the guest OS and applications running on the guest OS are aware of the suspension, the suspension to the disk is slow and consumes a significant amount of resources.

The second approach involves a host computing system pausing the virtual machine externally and saving the virtual machine memory and state information into a memory of the host OS. Although this approach is faster, it is disadvantageous because the guest OS is not aware that it is being suspended, which may create problems for applications running on the guest OS. For example, since the applications do not receive a notification of the suspension, the applications do not have the opportunity to flush their information to disk before being suspended and/or may experience an issue with an unexpected clock change when the virtual machine is resumed at a later time.

The present disclosure relates to methods and systems including cooperation between the guest OS and a hypervisor in order to achieve an efficient, fast, and accurate suspension and resumption of a virtual machine. Advantageously, the methods and systems provide a fast suspension and resumption of the virtual machine while making the guest OS aware of the suspension/resumption processing. Moreover, coupling the suspend to RAM processing with the external suspension and resumption processing enables the external suspension/resumption of a paused VM, which may be executed in a much quicker manner than if performed on a live, running and executing VM.

According to aspects of the present disclosure, in response to receiving a request to suspend an operation of a virtual machine (e.g., a user request to suspend), a hypervisor managing a virtual machine instructs a guest OS of the virtual machine to place the virtual machine into a standby or sleep mode or state wherein the virtual machine is suspended to memory of the guest OS (also referred to a "suspend to RAM" mode). Entry into the suspend to RAM mode provides any applications running on the guest OS with a notification of the suspension processing. Upon completion of the placement of the guest OS/virtual machine into the sleep or paused state, the hypervisor running on the host OS performs an external suspension of the virtual machine wherein the virtual machine memory and state information are migrated into storage (e.g., file-based storage, block-based storage, etc.) associated with the hypervisor/host OS.

Accordingly, a method and system for testing a virtual computing environment is provided that includes the cooperation of the hypervisor and the guest OS to efficiently suspend and resume a virtual machine in a fast and accurate manner wherein the guest OS and the applications running thereon are aware of the suspension and resumption processing. In addition, another advantage is achieved by the external suspension and resumption processing of a paused VM (e.g., the VM paused as a result of placement in the suspend to RAM mode). The external suspension/resumption of a paused VM may be executed in a much quicker manner than if performed on a live, running and executing VM. Furthermore, the external hibernation may be performed in a faster manner than an OS-executed internal hibernation.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing system 100 including a virtual machine 130 executing a guest OS 140 including a guest memory 150 and one or more applications 152.

The computer system 100 may also be referred to as a "host machine" or a "physical machine," and may be a server computer, a desktop computer, a mainframe, a workstation, a personal computer (PC), a mobile phone, a palm-sized computing device, etc.

The computing system 100 further includes a host OS 120 executing a hypervisor 125 configured to manage the execution of the virtual machine 130. The host OS 120 may further include a virtualization management application 122 (e.g., libvirt) configured to manage the hypervisor 125. In an example, the virtualization management application 122 may direct and/or control the hypervisor to perform the functionality described herein (e.g., the method described in detail below with reference to FIG. 2).

As shown in FIG. 1, the computer system 100 may include a central processing unit (CPU) 160 and host storage 170 which may include volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices.

The virtual machine 130 may include one or more of the following: memory, virtual CPU (e.g., a VCPU), virtual devices (e.g., emulated NIC or disk), The virtual computing system 106 may provide any suitable virtual machine platform such as, for example, VirtualBox, QEMU, VMWare Workstation, a Xen virtual machine, a Kernel Virtual Machine (KVM), or others.

The virtual machine 130 may include one or more virtual processors, each of which maps, possibly in a many-to-one fashion, to a central processing unit (CPU) (e.g., CPU 160) of the host machine. Similarly, a virtual machine may comprise one or more virtual devices (e.g., an emulated NIC or disk) each of which maps to a device of the host machine (e.g., a network interface device, a CD-ROM drive, etc.). For example, the virtual machine 130 may include a virtual disk that is mapped to an area of storage (known as a "disk image") of a particular storage device (e.g., a magnetic hard disk, a Universal Serial Bus (USB) solid state drive, a Redundant Array of Independent Disks (RAID) system, a network attached storage (NAS) array, etc.). In an example, the hypervisor 125 manages these mappings in a transparent fashion, thereby enabling the guest OS 140 and applications 152 executing on the virtual machine 130 to interact with the virtual processors and virtual devices as though they were actual physical entities. The virtual machine 130 may also include one or more physical devices over which a guest is given partial or full control, and/or firmware such as Basic Input/Output System (BIOS), Extensible Firmware Interface (EFI) and Advanced Configuration and Power Interface (ACPI).

In an example, the virtual processors, virtual devices of the virtual machine 130, physical devices and firmware (collectively referred to as the one or more "virtual machine devices") have state information associated therewith (e.g., state information stored in a guest memory) that is tracked and managed in connection with the suspension and/or resumption of the virtual machine 130 as described in detail below.

In accordance with an example, hypervisor 125 includes a VM suspension manager 128 that is capable of: coordinating with the guest OS 140 to execute a suspend to RAM operation and enter a sleep mode and externally suspend the guest OS 140 by migrating memory associated with the virtual machine 130 (i.e., the VM memory) and state information associated with the virtual machine devices (collectively referred to as the "VM information") to host storage 170. To resume the virtual machine 130, the VM suspension manager is capable of migrating the VM information from the host storage to the guest memory 150 and coordinate with the guest OS 140 to issue a resume instruction (e.g., an S3 resume/wake-up command) to wake up the guest OS. Example operations of the VM suspension manager 128 are described in detail below with respect to FIG. 2.

It should be noted that in some alternative examples, hypervisor 125 may be external to host OS 120, rather than embedded within host OS 120. It should further be noted that in some alternative examples, the VM suspension manager 128 may be a module of host OS 120, rather than a module of hypervisor 125. In addition, the VM suspension manager 128 may reside on a separate computer system, such as, for example, a server computer, a desktop computer, a mainframe, a workstation, a personal computer (PC), a mobile phone, a palm-sized computing device, etc.

In an example, the guest OS 140 may include an agent or module, referred to as a suspension agent 154, which is configured to communicate with the VM suspension manager 128 of the hypervisor 125 during execution of the suspension and/or resumption process of the present disclosure. In an example, the agent 154 may communicate with the VM suspension manager 128 via a virtio-serial device, such as, in the case of a QEMU or KVM hypervisor.

Advantageously, the VM suspension manager 128 manages and coordinates the accurate suspension and resumption of a virtual machine such that the guest OS and applications running thereon are provided with notification of the suspension by way of the execution of a suspend to RAM operation. In addition, following completion of the suspend to RAM operation, the VM suspension manager 128 performs an external suspension of the guest OS by migrating the VM information (e.g., the VM memory and/or the state information associated with the virtual machine devices) to host storage (e.g., a local disk or an external disk).

Figure 2:
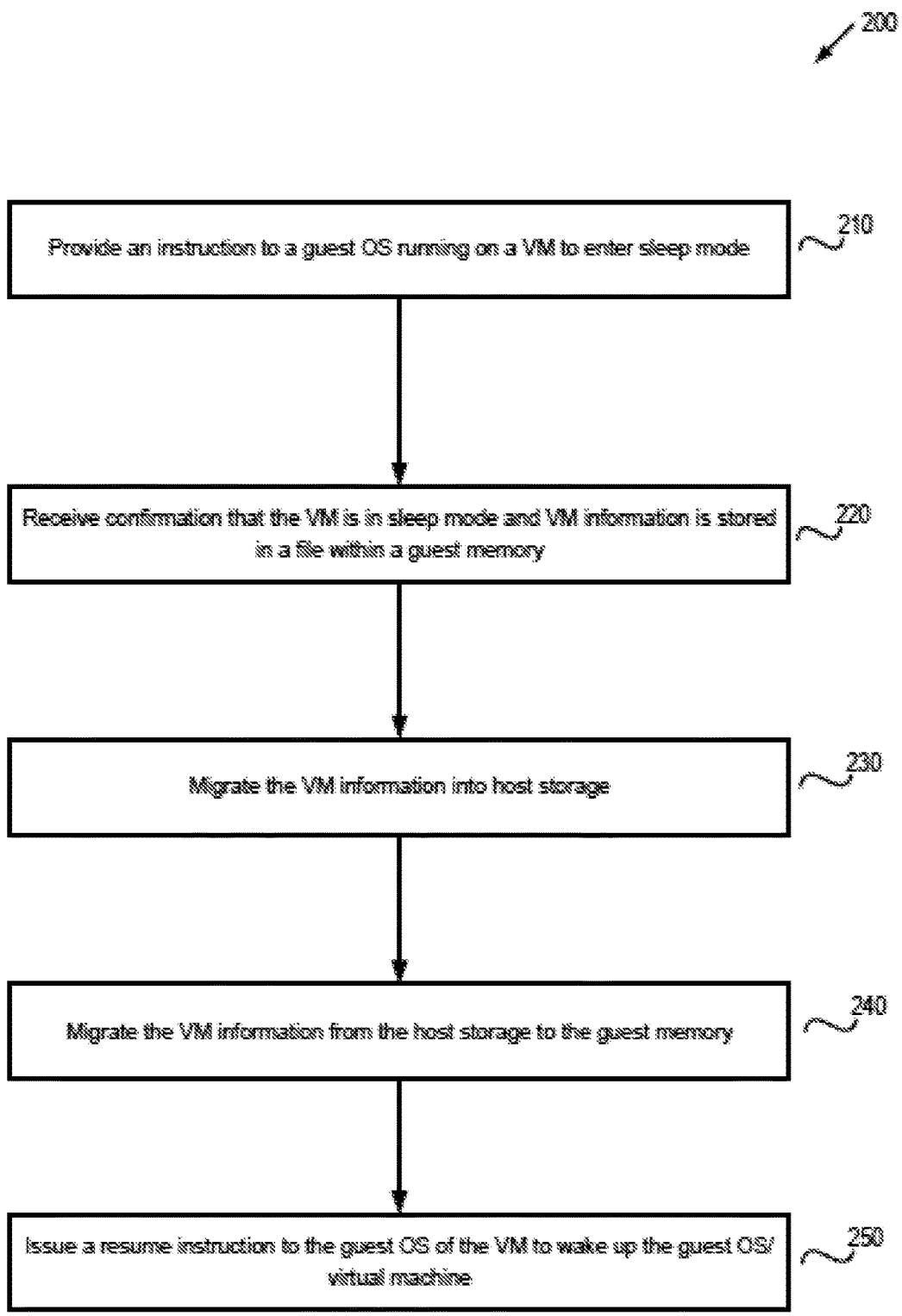
FIG. 2 is a flow diagram of an example method for suspending a virtual machine, according to an embodiment of the present disclosure.

FIG. 2 is a flow diagram illustrating an example of a method 200 relating to the operation of a VM suspension manager (e.g., the VM suspension manager 128 of FIG. 1). For example, the method 200 may be performed by a computer system 100 or a computer system 300 of FIG. 3 that may comprise hardware (e.g., circuitry, dedicated logic, programmable logic, microcode, etc.), software (e.g., instructions run on a processing device), or a combination thereof.

In response to receiving a request to suspend an operation of a virtual machine (e.g., a user request to suspend), in block 210, the VM suspension manager provides an instruction to a guest OS running a virtual machine to enter a sleep mode (e.g., to conserve power and electrical consumption). In an example, the hypervisor issues a suspend to RAM instruction (e.g., an S3 command in the Advanced Configuration and Power Interface (ACPI) protocol which places the virtual machine in a standby, sleep or suspend to RAM mode wherein the RAM remains powered) to the guest OS on the virtual machine. In an example, the VM suspension manager may issue the command to a suspension agent of the guest OS or issue a command directly to the virtual machine requesting the virtual machine to enter an sleep or hibernation state (e.g., an S3 state) using ACPI commands. In response to the command to enter the sleep mode, the VM information (e.g., the VM memory and/or the state information associated with the one or more virtual machine devices) is saved to the guest memory (e.g., saved to RAM) by the guest OS. It is noted that the portions of the VM memory and/or state information stored to the guest memory may vary depending on the guest OS (e.g., the information that is stored may be based on the guest OS type).

In an example, as part of entry into the sleep mode, the guest OS sends a notification to the one or more applications running on the guest OS of the suspension of the virtual machine. In light of the notification, the one or more applications are made aware of the suspension and may perform one or more actions in preparation for entry of the virtual machine into sleep mode, such as, for example, flushing application information to disk, conserve power, disconnecting tunnels, disconnecting open connections, securing client applications (e.g., signing out of banking software), auto-saving drafts of currently edited/opened documents, completing database transactions, etc.

In block 220, the VM suspension manager receives confirmation that the virtual machine is in sleep mode and that the VM information is stored in a file within the guest memory. In an example, the confirmation is provided by the suspension agent 154 of the guest OS.

Following confirmation that the virtual machine is paused, the VM suspension manager performs an external suspension of the guest OS, in block 230. In an example, the external suspension (or external hibernation) of the guest OS/virtual machine by the VM suspension manager includes migrating the VM information into the host storage (e.g., a local disk, an external disk, etc.). In an example, the guest OS is not aware of the external suspension and does not need to take any action in response thereto (e.g., notifying applications of the suspension process), thereby allowing the external suspension to proceed in a fast manner. Advantageously, the performance of the suspension to RAM (e.g., block 210) and the external suspension (e.g., block 230) provides for both a fast and accurate suspension process.

In block 240, the VM suspension manager may initiate a resumption process by migrating the VM information from the host storage to the guest memory. In an example, during the migration, the VM state and memory contents are migrated from storage to host memory. Following the migration to the guest memory, the VM suspension manager issues a resume instruction to the guest OS of the virtual machine to wake-up the guest OS and virtual machine. In an example, the VM suspension manager issues an S3 resume command using the ACPI protocol (e.g., a user-triggered command, such as a power up, to wake up the virtual machine). In an example, the guest OS wakes up the virtual machine and provide a notification to the one or more applications running on the guest OS that the virtual machine has been resumed.

Figure 3:
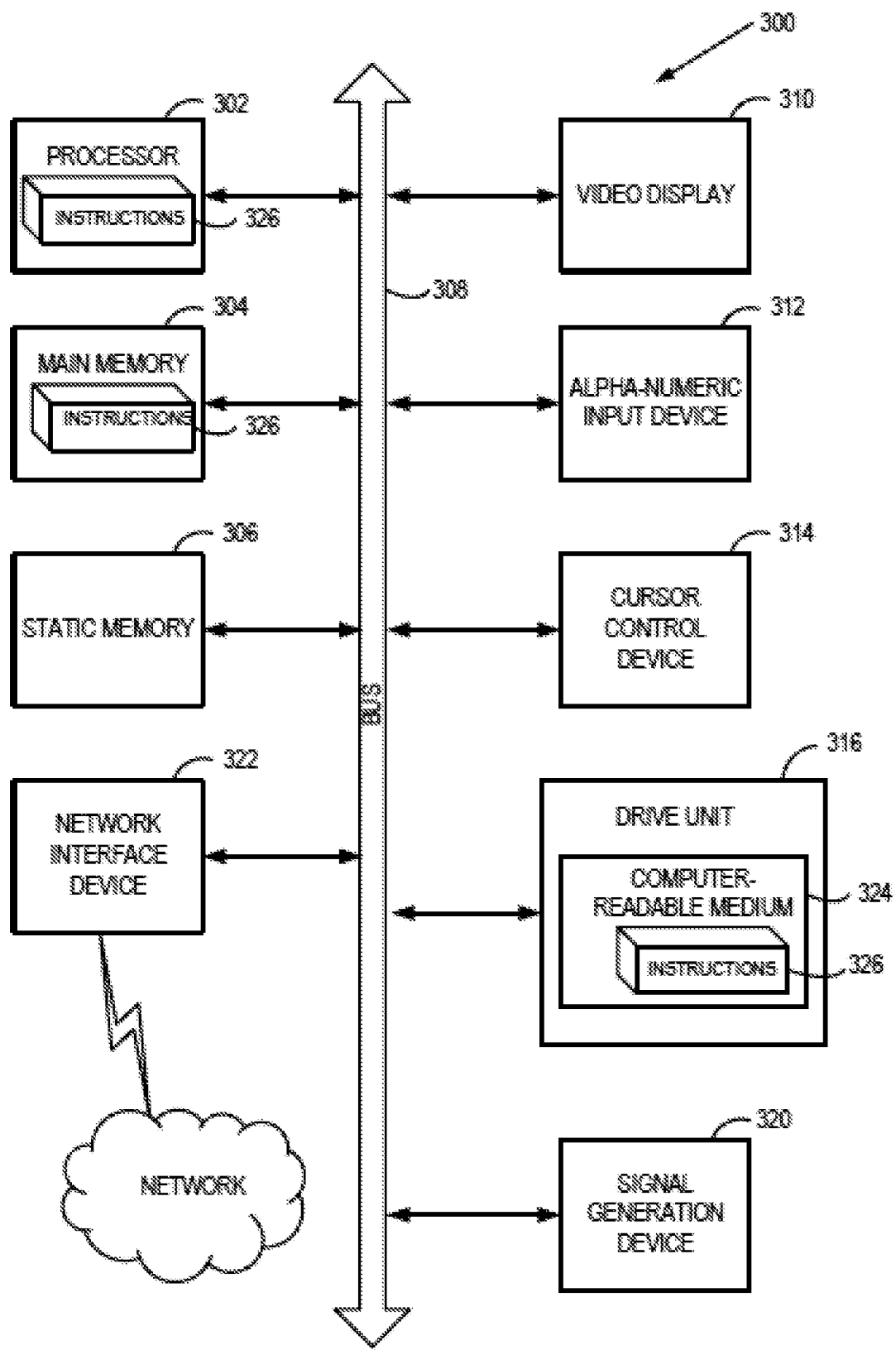
FIG. 3 illustrates a diagrammatic representation of an example virtual machine suspension system, according to an embodiment of the present disclosure.

FIG. 3 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the methods of FIG. 2) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "providing", "receiving", "suspending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   in response to receiving a request to suspend an operation of a virtual machine executed by a processing device of a host computing system comprising host storage, providing, by the processing device executing a hypervisor to a guest operating system of the virtual machine, an instruction for the virtual machine to enter a sleep mode, wherein entering the sleep mode comprises:
      storing state information of the virtual machine to a random access memory (RAM) of the guest operating system, wherein the RAM remains powered in the sleep mode; and
      sending, during the sleep mode, a suspension notification to an application of the virtual machine to enable the application to flush data to a disk prior to suspension of the virtual machine;
   receiving, by the hypervisor from the guest operating system, a confirmation that the virtual machine is in the sleep mode; and
   in response to receiving the confirmation, migrating the state information of the virtual machine to the host storage.

2. The method of claim 1, wherein the host storage comprises at least one of a local disk or an external disk.

3. The method of claim 1, further comprising:
   migrating, by the hypervisor, the virtual machine information from the host storage to the RAM; and
   issuing, by the hypervisor, a resume instruction to the guest operating system to wake up the virtual machine.

4. The method of claim 1, wherein the instruction for the virtual machine to enter the sleep mode comprises a S3 ACPI command.

5. The method of claim 1, wherein the confirmation received by the hypervisor confirms that the state information of the virtual machine has been stored in a file within the RAM.

6. A non-transitory computer readable storage medium comprising instructions that, when executed by a processing device, cause the processing device to:
   in response to receiving a request to suspend an operation of a virtual machine executed by the processing device of a host computing system comprising host storage, provide, by the processing device executing a hypervisor to a guest operating system of the virtual machine, an instruction for the virtual machine to enter a sleep mode, wherein entering the sleep mode wherein entering the sleep mode causes the processing device to:
      store state information of the virtual machine to a random access memory (RAM) of the guest operating system, wherein the RAM remains powered in the sleep mode; and
      send, during the sleep mode, a suspension notification to an application of the virtual machine to enable the application to flush data to a disk prior to suspension of the virtual machine;
   receive, by the processing device from the guest operating system, a confirmation that the virtual machine is in the sleep mode; and
   in response to receipt of the confirmation, migrate the state information of the virtual machine to the host storage.

7. The non-transitory computer readable storage medium of claim 6, wherein the host storage comprises at least one of a local disk or an external disk.

8. The non-transitory computer readable storage medium of claim 6,
   wherein the processing device further to:
   migrate, by the processing device, the virtual machine information from the host storage to the RAM; and issue, by the processing device, a resume instruction to the guest operating system to wake up the virtual machine.

9. The non-transitory computer readable storage medium of claim 6, wherein the instruction for the virtual machine to enter the sleep mode comprises a S3 ACPI command.

10. The non-transitory computer readable storage medium of claim 6, wherein the confirmation received by the hypervisor confirms the state information of the virtual machine has been stored in a file within the RAM.

11. A system comprising:
 a memory to store instructions; and
 a processing device of a host computing system, operatively coupled to the memory, to execute the instructions to cause the processing device to:
  in response to a request to suspend an operation of a virtual machine, provide an instruction for the virtual machine to enter a sleep mode, wherein entering the sleep mode causes the processing device to:
   store state information of the virtual machine to a random access memory (RAM) of the guest operating system, wherein the RAM remains powered in the sleep mode; and
   send, during the sleep mode, a suspension notification to an application of the virtual machine to enable the application to flush data to a disk prior to suspension of the virtual machine;
  receive a confirmation that the virtual machine is in the sleep mode; and
  in response to receipt of the confirmation, migrate the virtual machine the state information of the virtual machine to the memory.

12. The system of claim method of claim 11, the processing device to:
 migrate the virtual machine information from the memory to the RAM; and
 issue a resume instruction to the guest operating system to wake up the virtual machine.

13. The system of claim 11, the virtual machine to enter the sleep mode comprises a S3 ACPI command.

14. The system of claim 11, wherein the confirmation confirms the state information of the virtual machine has been stored in a file within the RAM.

\* \* \* \* \*